(12) United States Patent
Li et al.

(10) Patent No.: US 10,774,193 B2
(45) Date of Patent: Sep. 15, 2020

(54) METHOD OF CONTINUOUSLY RECYCLING THERMOSET PLASTIC WASTE

(71) Applicant: Nano and Advanced Materials Institute Limited, Hong Kong (CN)

(72) Inventors: Kai Li, Hong Kong (CN); Tik Ho Lau, Hong Kong (CN); Ho Yin Fong, Hong Kong (CN)

( * ) Notice: Subject to any disclaimer, the term of this patent is extended or adjusted under 35 U.S.C. 154(b) by 0 days.

(21) Appl. No.: 16/368,893

(22) Filed: Mar. 29, 2019

(65) Prior Publication Data

US 2019/0309141 A1 Oct. 10, 2019

Related U.S. Application Data

(60) Provisional application No. 62/761,707, filed on Apr. 4, 2018.

(51) Int. Cl.
*C08J 11/08* (2006.01)

(52) U.S. Cl.
CPC ............ *C08J 11/08* (2013.01); *C08J 2323/06* (2013.01); *C08J 2361/06* (2013.01); *C08J 2363/00* (2013.01)

(58) Field of Classification Search
USPC .......................................................... 521/47
See application file for complete search history.

(56) References Cited

U.S. PATENT DOCUMENTS 7,569,617 B2   8/2009   Mukaide et al.

FOREIGN PATENT DOCUMENTS

CN    104877245    9/2015
JP    2001192495   7/2001

OTHER PUBLICATIONS

Bum Ki Baek, Ji Wook Shin, Jun Yong Jung, Soon Man Hong, Gi Joon Nam, Haksoo Han, Chong Min Koo. "Continuous Supercritical Decrosslinking Extrusion Process." Journal of Applied Polymer (2015): 41442.
Hong-shik Lee, Ju Hyeong Jeong, Giyoung Hong, Hang-Kyu Cho, Bum Ki Baek, Chong Min Koo, Soon Man Hong, Jaehoon Kim, and Youn-Woo Lee. "Effect of Solvents on De-Cross-Linking of Cross-Linked Polyethylene under Subcritical and Supercritical Conditions." Industrial & Engineering Chemistry Research (2013): 6633-6638.
Yong Jin Kwon, Soon Man Hong, Chong Min Koo. "Viscoelastic Properties of Decrosslinked Irradiation-Crosslinked Polyethylenes in Supercritical Methanol." Journal of Polymer Science: Part B: Polymer Physics (2010): 1265-1270.
Motonobu Goto. "Supercritical Water Process for the Chemical Recycling of Waste Plastics". AIP Conf. Proc. 1251, 169-172 (2010).

*Primary Examiner* — Terressa Boykin
(74) *Attorney, Agent, or Firm* — Eagle IP Limited; Jacqueline C. Lui (57) ABSTRACT

The present invention relates to a method of continuously recycling thermoset plastic waste. The method includes crushing the thermoset plastic waste into pieces with a diameter size suitable for being fed into an extruder. The method also includes purifying the thermoset plastic waste by cleaning the thermoset plastic waste using a cleaning agent to remove contaminants from the thermoset plastic waste. The method also includes extruding the thermoset plastic waste by using supercritical solvent.

19 Claims, 7 Drawing Sheets

METHOD OF CONTINUOUSLY RECYCLING THERMOSET PLASTIC WASTE

FIELD OF INVENTION

This invention relates to a method of recycling plastic waste, and in particular a method of continuously recycling thermoset plastic waste.

BACKGROUND OF INVENTION

In recent years, problems caused by recycling municipal solid waste (MSW) still remain a significant challenge to the global environment. Plastic wastes are the major portions among different types of waste being disposed. Conventional methods of recycling plastic wastes include landfill and incineration. However, these methods lead to serious concerns on the environment and human health, and they have drawn more public attention due to the side effects.

On the other hand, there is an increasing demand for recycling/reusing plastic wastes, due to the concern of resource consumption. Thermoplastic resins can be fluidized by heating so that they can be remolded and reused as raw materials for further production. On the contrary, thermoset wastes, which contribute to nearly half of all plastic wastes, are impossible to recycle. The most challenging point of recycling thermoset wastes is that they cannot be fluidized through conventional heating methods, due to the dense structure of their three-dimensional network. The networks exist as linkages between the macromolecule chains, which may cause decomposition of thermoset wastes before melting, at a high temperature of above 600° C.

Therefore, most thermoset wastes are directly disposed to a landfill or incinerator for recycling. However, none of the existing recycling methods are cost-effective, environmentally friendly or continuous. The existing methods, such as treating the thermoset wastes by chemical reagents under high temperature and pressure in an enclosed autoclave reactor, are proven to have low efficiency and productivity, and high consumption of power and chemicals. Therefore, it is necessary to develop a more cost-efficient and safer method for recycling thermoset plastic wastes.

SUMMARY OF INVENTION

The present invention describes a continuous, harmless and effective solution for recycling the thermoset wastes, which can provide an alternative for mass recycling. The crosslinked networks in the thermoset wastes, such as crosslinked epoxy, phenolic resins or XLPE, can be effectively broken down by the continuous decrosslinking process and the resultant recycled thermoset waste exhibits similar properties to the linear molecular structure of virgin plastic.

One example embodiment provides a method that continuously recycles thermoset plastic waste. The method includes crushing the thermoset plastic waste into pieces. The pieces have a diameter size suitable for being fed into an extruder. The method also includes purifying the thermoset plastic waste by cleaning the thermoset plastic waste using a cleaning agent to remove contaminants from the thermoset plastic waste. The method further includes decrosslinking the thermoset plastic waste by combining a supercritical solvent and the thermoset plastic waste in an extruder and extruding the thermoset plastic waste under a temperature of 200-400° C. and an extrusion pressure of 10-150 bar.

In some embodiments, a liquid solvent is introduced into an extruder and turns into the supercritical solvent under the temperature of 200-400° C. and the extrusion pressure of 10-150 bar. Crosslinking structure between macromolecules in the thermoset plastic waste is broken down to obtain decrosslinked thermoset waste by the supercritical solvent so that the decrosslinked thermoset waste is continuously extruded out from the extruder.

Other example embodiments are discussed herein.

DETAILED DESCRIPTION

Example embodiments relate to methods of continuously recycling thermoset plastic waste by extruding the thermoset plastic waste with supercritical solvent. The recycled product obtained by the methods has similar physical, mechanical and chemical properties as compared with its virgin equivalence.

Thermoset plastic waste is difficult recycle due to its incapacity of being fluidized by conventional heating methods. Example embodiments solve the problem by providing a cost-effective and environment friendly method that can be scaled up for mass production to decrosslink three-dimensional network of the thermoset plastic waste by using supercritical solvent and extruding the decrosslinked thermoset plastic waste out from an extruder in a continuous manner without compromising the quality and yield of the recycled products. The thermoset plastic waste can be completely decrosslinked even though the dwelling time of the thermoset plastic waste in the extruder is less than 5 minutes.

Existing methods for treating thermoset plastic waste are known as batch process, a non-continuous process. For the batch process, a certain amount of thermoset plastic waste and solvents are fed into a tightly sealed reactor. After the decrosslinking reaction takes place for a certain period of time, the recycled materials as product are collected in a batch. The same process should be repeated, to prepare another batch of recycled materials. This non-continuous process is time-consuming and cannot be easily for scale-up production. Example embodiments provides a continuous process of recycling the thermoset plastic waste in which there is a steady stream of recycles materials production while the thermoset waste is constantly fed into the extruder. In one example embodiment, the thermoset waste is fed into the extruder at a constant rate and recycled material is collected at a constant rate.

In one example embodiment, the method includes crushing the thermoset plastic waste into pieces with a diameter size suitable for being fed into an extruder to obtain crushed thermoset waste. In one example embodiment, the thermoset plastic waste is crushed into small size that is suitable for being fed into the extruder hopper. In one example embodiment, the crushing step is accomplished by a plastic crusher.

In one example embodiment, without crushing into small pieces, the extrusion for the thermoset plastic waste cannot be initiated, as the thermoset plastic waste is too large to be fed into the extruder. In one example embodiment, a crushing machine with cutting blade of 2~5 mm width is used, so as to break down the thermoset plastic waste into suitable size to facilitate the purification and material feeding into the extruder.

In one example embodiment, the thermoset plastic waste is selected from a group consisting of epoxy resin, phenolic resins and polyethylene (XLPE). In one example embodiment, the thermoset plastic waste is XLPE foam.

In one example embodiment, the method includes purifying the thermoset plastic waste by cleaning the thermoset plastic waste using a cleaning agent to remove contaminants from the thermoset plastic waste, in one example embodiment, the crushing process is followed by the purification process which purifies the crushed thermoset plastic waste to obtain purified thermoset plastic waste.

Contaminants such as soil, dust, rocks, metal fibers, metal residues, and liquid contaminants, etc. exist in the thermoset plastic waste. Some contaminants are attached on the surface of thermoset plastic waste. A cleaning process by the filtration and separation is introduced to increase the purity of the thermoset plastic waste and avoid any mechanical failure of the extruder since some contaminants could jam the extruder during extrusion.

In one example embodiment, the filtration through an appropriate filter or sieves is utilized to remove the solid contaminants. In one example embodiment, the thermoset plastic waste is cleaned by a cleaning agent in an ultrasonic bath to remove the surface contaminants from the thermoset plastic waste. In one example embodiment, the cleaning agent is selected from a group consisting of water, methanol, ethanol, isopropyl alcohol and a mixture thereof.

In one example embodiment, the thermoset plastic waste is mixed in the cleaning agent, and cleaned by the cleaning agent in the ultrasonic bath for at a temperature of 40-80° C. for 10-30 minutes. In one example embodiment, the thermoset plastic waste is filtered through a filtration mesh so that the contaminants in the thermoset plastic waste are removed. In one example embodiment, the thermoset plastic waste is dried for further use such as extrusion.

The purification process effectively removes the contaminants and purifies the thermoset plastic waste to obtain recycled materials with a relatively high quality.

In one example embodiment, the method includes decrosslinking the thermoset plastic waste by combining a supercritical solvent and the thermoset plastic waste in the extruder and extruding the thermoset plastic waste under a temperature of 200-400° C. and an extrusion pressure of 10-150 bar.

In one example embodiment, the liquid solvent is injected inside the extruder and becomes supercritical solvent when the temperature of 200-400° C. and the extrusion pressure of 10-150 bar are applied to the liquid solvent. In one example embodiment, the thermoset plastic waste is decrosslinked at the temperature of 200-400° C. and the extrusion pressure of 10-150 bar by the supercritical solvent. In one example embodiment, the thermoset plastic waste is extruded by the extruder at the temperature of 200-400° C. and the extrusion pressure of 10-150 bar.

In one example embodiment, the liquid solvent is introduced into the extruder via an injection feeder and becomes the supercritical state when a temperature of 200-400° C. and an extrusion pressure of 10-150 bar are applied to the liquid solvent in the extruder. The supercritical solvent is utilized to decrosslink the thermoset plastic waste. In one example embodiment, the liquid solvent is injected into an extruder at a solvent injection rate of 1-50 mL/min. In one example embodiment, the thermoset plastic waste is introduced into the extruder at a thermoset feed rate of 1-60 g/min. Crosslinking structure between macromolecules in the thermoset plastic waste is broken down to obtain decrosslinked thermoset waste so that the decrosslinked thermoset waste is continuously extruded out from the extruder. In one example embodiment, the extruding process requires only one extruder.

In one example embodiment, the purification process is followed by the extruding process. In one example embodiment, the extruding process requires a single screw extruder. In one example embodiment, the extruding process is one-step extrusion wherein the thermoset plastic waste and a liquid solvent are introduced into the same single extruder; the liquid solvent becomes a supercritical solvent in the extruder; and the crosslinking structure between the macromolecules in the thermoset plastic waste is significantly broken down under the application of the supercritical solvent; and the recycled thermoset plastic is extruded out from the extruder. The one-step extrusion does not require a second extruder so that the method achieves continuous recycling for thermoset plastic waste.

In one example embodiment for extruding process, the thermoset plastic waste is fed into an extruder equipped with a liquid injection feeder. The liquid solvent and thermoset plastic waste are introduced into the extruder. In one example embodiment, the liquid solvent and the thermoset plastic waste are introduced into the extruder simultaneously. In one example embodiment, the liquid solvent and the thermoset plastic waste are introduced into the extruder with a thermoset feed rate of 1-60 g/min and a solvent injection rate of 1-50 mL/min, respectively. The term "thermoset feed rate (g/min)" to represent how many grams of thermoset plastic waste are fed into the extruder per minute; and the term of "solvent injection rate (mL/min)" is to represent how much volume of liquid solvent is injected to the extruder.

In one example embodiment, the temperature and pressure of each zone in the extruder are controlled and monitored. Parameters of the extruder, including the temperature, injected solvent type & feeding rate, screw rotating speed and extrusion pressure can significantly affect the decrosslinking process.

In one example embodiment, the screw rotating speed of the extruder is in a range of 1-80 rpm.

In one example embodiment, the liquid solvent is selected from a group consisting of methanol, ethanol, isopropyl alcohol and a mixture thereof. In one example embodiment, water is not used as the liquid solvent since water requires very high working temperature and pressure which makes the extrusion process unsafe.

In one example embodiment, when the thermoset plastic waste is XLPE, the thermoset plastic waste is introduced into the extruder at a thermoset feed rate of 20-30 g/min, a screw rotating speed of the extruder is 15-20 rpm, the liquid solvent is ethanol and is introduced into the extruder at a solvent injection rate of 2-3 mL/min, the extrusion pressure is 105-115 bar, and the temperature is 240-370° C.

In one example embodiment, when the thermoset plastic waste is XLPE, the thermoset plastic waste is introduced into the extruder at the thermoset feed rate of 30 g/min, the screw rotating speed of the extruder is 15 rpm, the liquid solvent is ethanol and is introduced into the extruder at the solvent injection rate of 3 ml/min, the extrusion pressure is 105 bar, and the temperature is 240-310° C.

In one example embodiment, when the thermoset plastic waste is XLPE, the thermoset plastic waste is introduced into the extruder at the thermoset feed rate of 20 g/min, the screw rotating speed of the extruder is 20 rpm, the liquid solvent is ethanol and is introduced into the extruder at the solvent injection rate of 2 mL/min, the extrusion pressure is 115 bar, and the temperature is 250-370° C.

In one example embodiment, when the thermoset plastic waste is phenolic resin, the thermoset plastic waste is introduced into the extruder at a thermoset feed rate of 15-20 g/min, a screw rotating speed of the extruder is 20-30 rpm, the liquid solvent is ethanol and is introduced into the extruder at a solvent injection rate of 5 mL/min, the extrusion pressure is 80-96 bar, and the temperature is 240-320° C.

In one example embodiment, when the thermoset plastic waste is phenolic resin, the thermoset plastic waste is introduced into the extruder at the thermoset feed rate of 20 g/min, the screw rotating speed of the extruder is 20 rpm, the extrusion pressure is 80 bar, and the temperature is 240-300° C.

In one example embodiment, when the thermoset plastic waste is phenolic resin, the thermoset plastic waste is introduced into the extruder at the thermoset feed rate of 15 g/min, the screw rotating speed of the extruder is 30 rpm, the extrusion pressure is 96 bar, and the temperature is 260-320° C.

In one example embodiment, when the thermoset plastic waste is epoxy resin, the thermoset plastic waste is introduced into the extruder at a thermoset feed rate of 16-21 g/min, a screw rotating speed of the extruder is 15-25 rpm, the liquid solvent is ethanol and is introduced into the extruder at a solvent injection rate of 5 mL/min, the extrusion pressure is 80-96 bar, and the temperature is 230-330° C.

In one example embodiment, when the thermoset plastic waste is epoxy resin, the thermoset plastic waste is introduced into the extruder at the thermoset feed rate of 21 g/min, the screw rotating speed of the extruder is 15 rpm, the extrusion pressure is 80 bar, and the temperature is 230-310° C.

In one example embodiment, when the thermoset plastic waste is epoxy resin, the thermoset plastic waste is introduced into the extruder at the thermoset feed rate of 16 g/min, the screw rotating speed of the extruder is 25 rpm, the extrusion pressure is 96 bar, and the temperature is 260-330° C.

In one example embodiment, the extruded thermoset plastic waste is pelletized into small pellets by a pelletizer. The pelletized thermoset plastic waste is reused as raw materials to replace the same virgin plastics for manufacturing.

The decrosslinking efficiency is improved when the extrusion temperature and pressure make the liquid solvent achieve the supercritical condition. The extrusion pressure is closely related to the screw speed, which is resulted from the increasing applied pressure with higher screw speed. Besides, the screw speed determines the dwelling time of thermoset plastic waste in the extruder: the greater of the screw speed, the shorter dwelling time for the thermoset waste.

Figure 1:
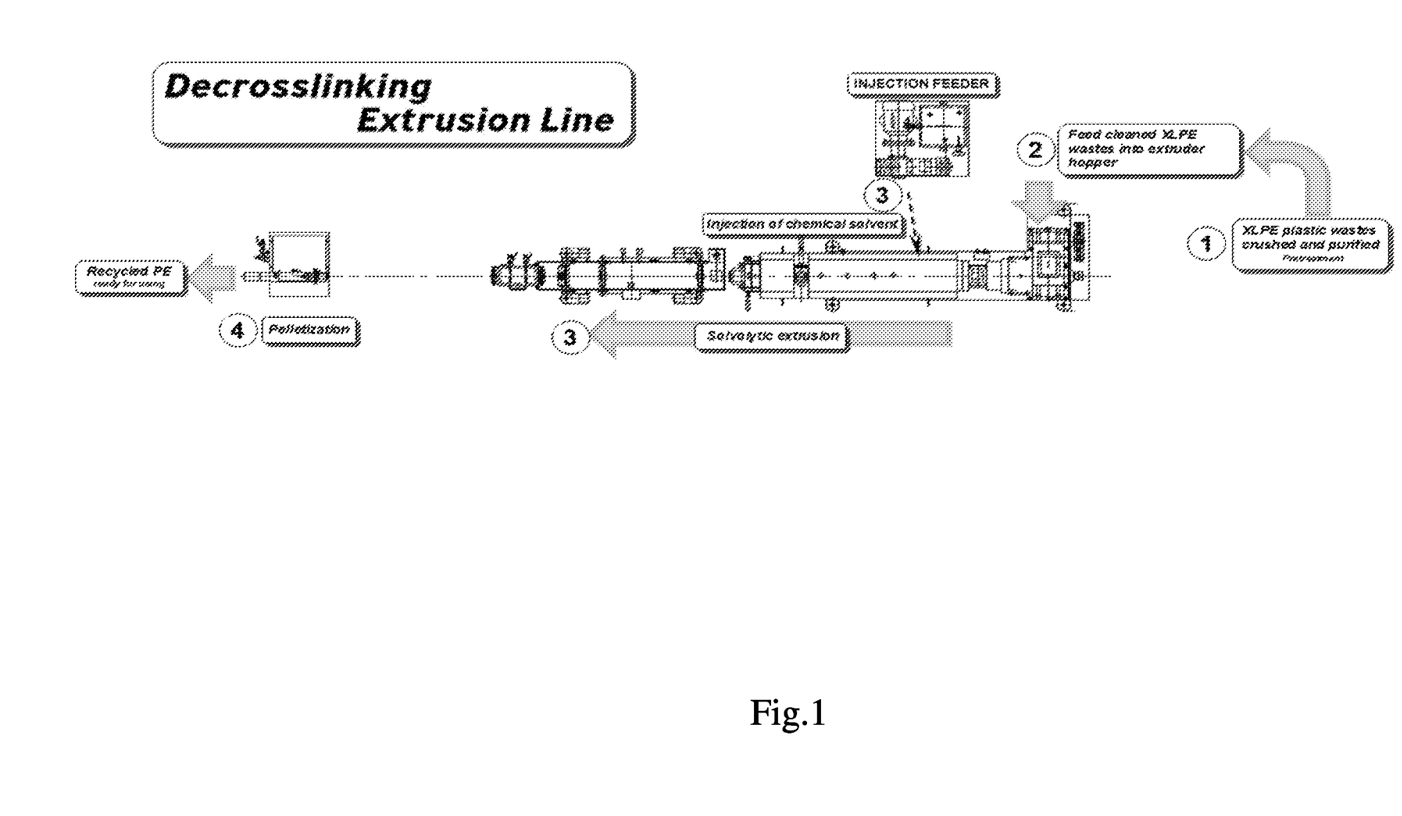
FIG. 1 is a flow chart of a continuous recycling process for the thermoset plastic waste through an extruder in accordance with an example embodiment.

FIG. 1 shows a flow chart of the continuous recycling process for the thermoset plastic waste through an extruder in accordance with an example embodiment. The extruder is equipped with an injection feeder by which the liquid solvent is injected into the extruder. The extruder is equipped with elements that provide a high temperature and pressure which make liquid solvent become supercritical solvent.

In one example embodiment as shown in FIG. 1, XLPE plastic waste is crushed and purified to obtain cleaned XLPE waste. The cleaned XLPE waste is fed into the extruder hopper. The extruder is equipped with an injection feeder. The liquid solvent undergoes a temperature of 200-400° C. and an extrusion pressure of 10-150 bar and turns into supercritical form. The supercritical solvent and the XLPE waste enter the extrusion line. The XLPE waste undergoes solvolytic extrusion in the extruder by the supercritical solvent under the temperature of 200-400° C. and the extrusion pressure of 10-150 bar. The extruded waste is pelleted to obtain recycled PE. In one example embodiment, the XLPE and the liquid solvent are simultaneously introduced into the extruder.

EXAMPLES

Example 1-2

Decrosslinking of XLPE Waste

XLPE foam was one of the main thermoset wastes from MSW. It was recycled by the decrosslinking process through the supercritical solvolytic extrusion. The XLPE foam has a highly crosslinked foaming structure (a low density of ~0.2 g/cm$^3$) and gel content of ~60% (identified by ASTM D2765). Table 1 lists the experimental conditions for decrosslinking XLPE waste. They can be extruded out in less than 5 min.

TABLE 1

| | The experiment parameters for decrosslinking XLPE | | | | | |
|---|---|---|---|---|---|---|
| Example | Thermoset feeding rate (g/min) | screw rotating speed (rpm) | Solvent Type &solvent injection rate | Extrusion pressure (bar) | Temperature range of extruder (° C.) | Extrusion Time (min) |
| Example-1 | ~30 | 15 | Ethanol, ~3 mL/min | 105 | 240~310 | 4.5 |
| Example-2 | ~20 | 20 | Ethanol, ~2 mL/min | 115 | 250~370 | 3.2 |

500 g of XLPE were crushed into [5 mm×5 mm] size pellets and then mixed with ethanol and acetone in an ultrasonic bath at a temperature of 60° C. for 30 minutes, filtered through a filtration mesh so that contaminants are removed; and then dried to form purified pellets. The purified pellets were then fed into an extruder which was set at a screw rotating speed (rpm), pressure (bar), temperature (° C.), time (minutes), and thermoset feed rate as described in Table 1 simultaneously with ethanol at the solvent injection rate described in Table 1 at an extrusion time in Table 1 to form extruded XLPE.

Figure 2:
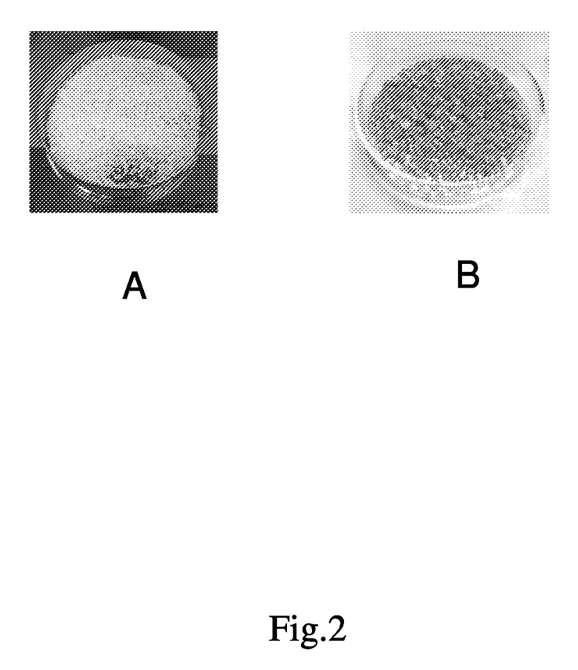
FIG. 2 is photos of raw polyethylene (XLPE) waste (A) and recycled XLPE by the decrosslinking process (B) in accordance with an example embodiment.
Figure 3:
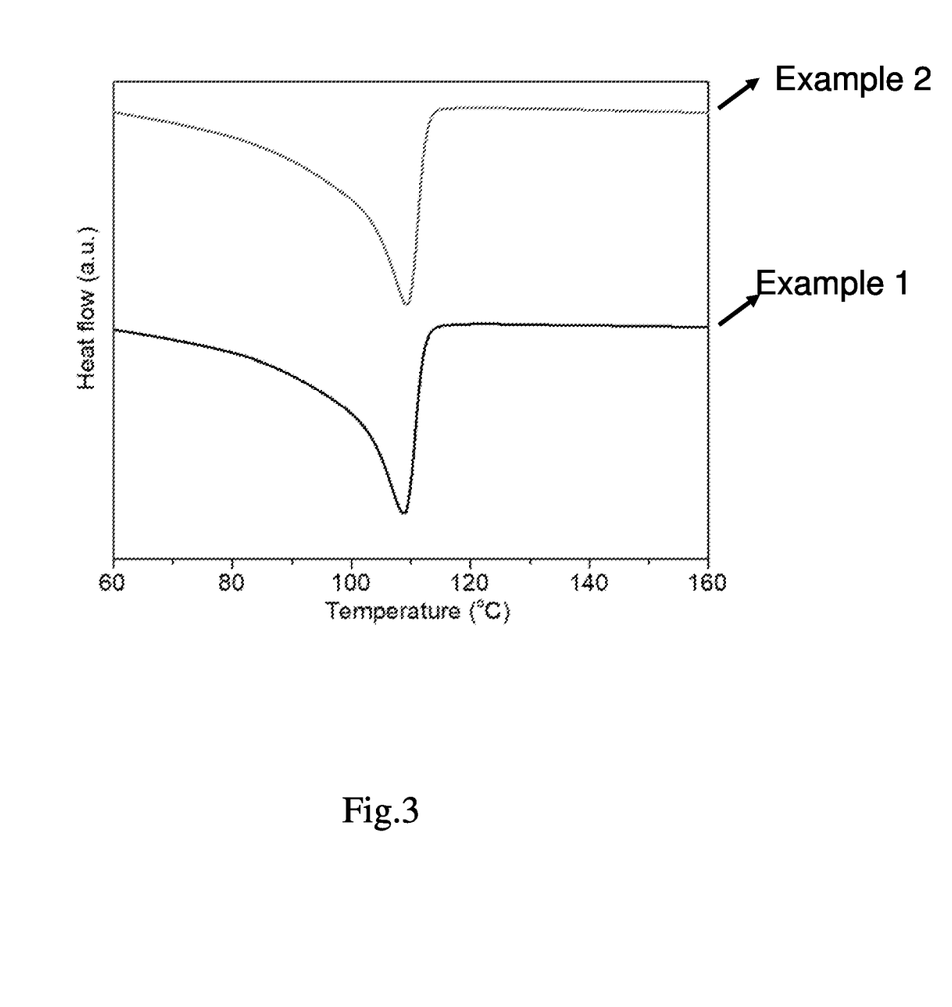
FIG. 3 is differential scanning calorimetry (DSC) curves of the recycled XLPE in accordance with an example embodiment.

After supercritical extrusion, the extruded XLPE was pelletized. Gel content is the most direct indicator of the decrosslinking degree for this thermoset, which is determined by ASTM D2765. The mechanical properties were evaluated according to ASTM D638-10. Moreover, differential scanning calorimetry (DSC) test was used to determine the melting behavior. After decrosslinking, gel content of the recycled XLPE was zero as shown in table 2, indicating no existence of crosslinked structure. The mechanical property was kept at the identical level as that of virgin PE. The recycled XLPE had almost the same melting behavior as the commercial thermoplastic polyethylene, both exhibiting a melting point around 110° C. from the DSC curve. All these results prove the quality of recycled XLPE is the same as virgin PE.

TABLE 2

Properties of virgin LDPE and decrosslinked XLPE wastes

| Properties | Virgin LDPE | XLPE waste | Example 1 | Example 2 |
|---|---|---|---|---|
| Gel content (%) | 0.00 | 65.20 | 0 | 0 |
| Tensile strength (MPa) | 16.0 | — | 15.7 | 14.2 |
| Elongation at break (%) | 1000 | — | 913 | 820 |

Example 3-4

Decrosslinking of Crosslinked Phenolic Resin

Crosslinked phenolic resin was another thermoset waste from MSW. It was recycled by the decrosslinking process via the supercritical solvolytic extruder in this invention. The phenolic resin has a dense crosslinking structure after poly-condensation and table 3 lists the decrosslinking conditions for phenolic resin wastes. They can also be extruded out in less than 5 min.

TABLE 3

The experiment parameters for decrosslinking crosslinked phenolic resin

| Example | Thermoset feeding rate (g/min) | screw rotating speed (rpm) | Solvent type &solvent injection rate | Extrusion pressure (bar) | Temperature range of extruder (° C.) | Extrusion Time (min) |
|---|---|---|---|---|---|---|
| Example-3 | ~20 | 20 | Ethanol, ~5 mL/min | 80 | 240~300 | 3.5 |
| Example-4 | ~15 | 30 | Ethanol, ~5 mL/min | 96 | 260~320 | 2.5 |

Figure 4A:
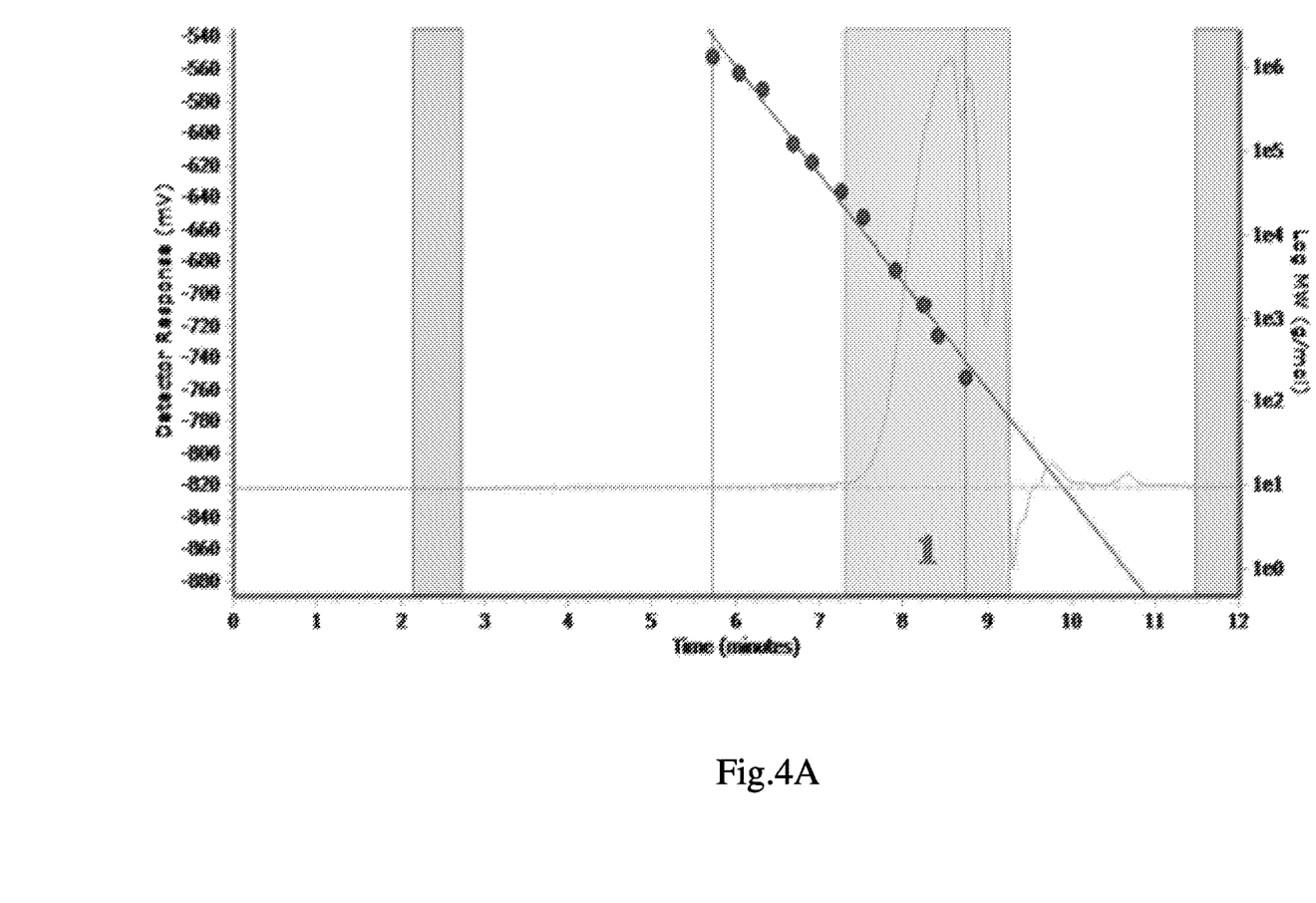
FIG. 4A is gel permeation chromatography (GPC) curves of recycled crosslinked phenolic resins in accordance with an example embodiment.
Figure 4B:
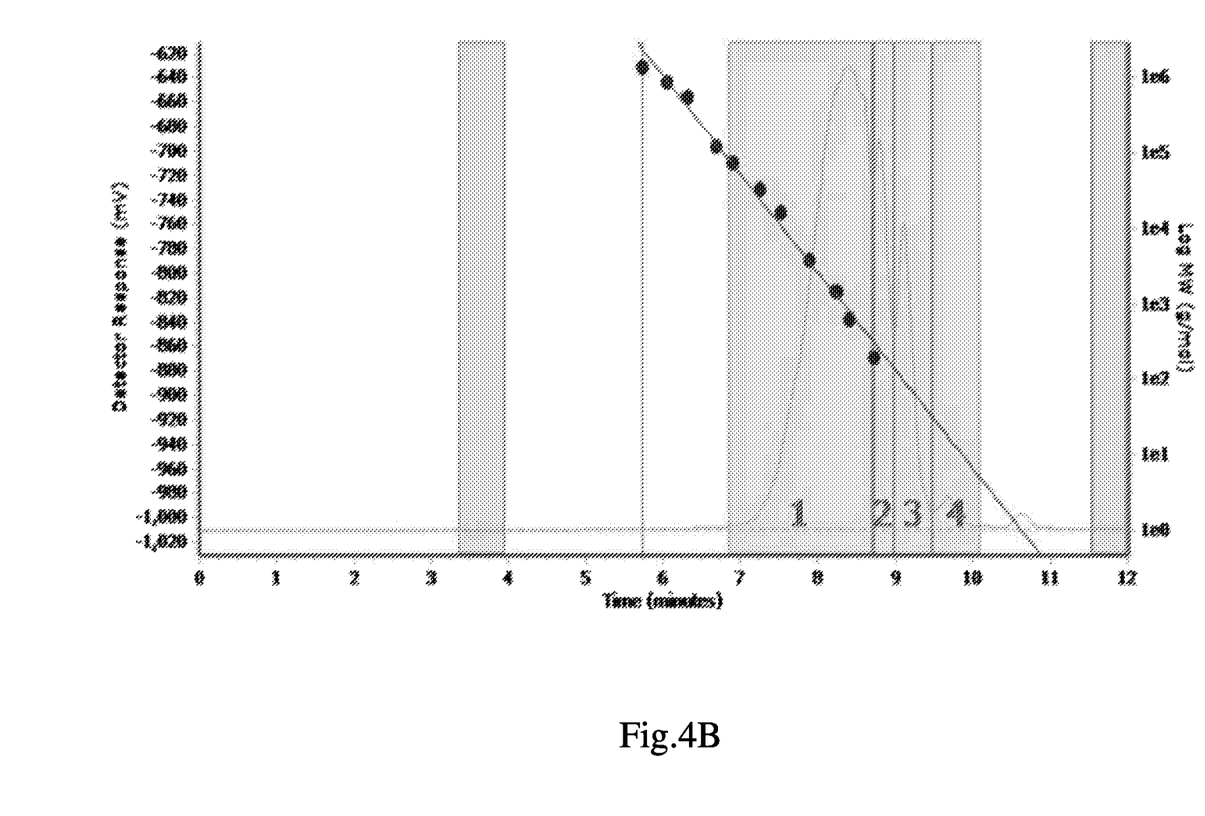
FIG. 4B is GPC curves of recycled crosslinked phenolic resins in accordance with another example embodiment.

From the gel permeation chromatography (GPC) curves of the decrosslinked phenolic resins, prominent peak representing linear macromolecule appears in both examples 3 and 4, after decrosslinking reaction via the extruder. This indicated that certain amount of linear polymer molecules were generated by the decrosslinking reaction.

Example 5-6

Decrosslinking of Crosslinked Epoxy Resin

Crosslinked epoxy resin was another thermoset waste from MSW. It was recycled by the decrosslinking process via the supercritical solvollytic extrusion in this example. The epoxy resin can have crosslinking structure after poly-condensation and table 4 lists the decrosslinking conditions for the crosslinked epoxy resin. They can be extruded out in less than 5 min.

TABLE 4

The experiment parameters for decrosslinking epoxy resin

| Example | Thermoset feeding rate (g/min) | screw rotating speed (rpm) | Solvent Type &solvent injection rate | Extrusion pressure (bar) | Temperature range of extruder (° C.) | Extrusion Time (min) |
|---|---|---|---|---|---|---|
| Example-5 | ~21 | 15 | Ethanol, ~5 mL/min | 80 | 230~310 | 4.3 |
| Example-6 | ~16 | 25 | Ethanol, ~5 mL/min | 96 | 260~330 | 3.0 |

Figure 5A:
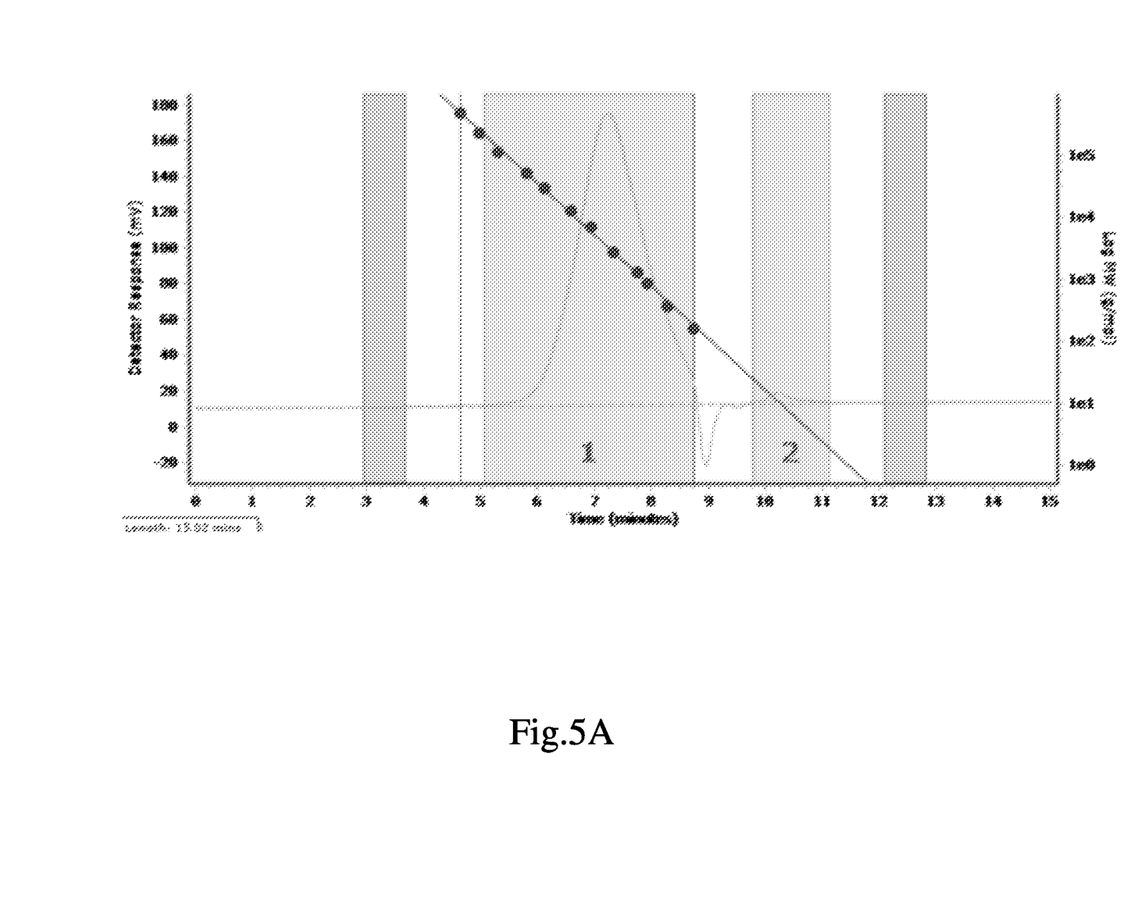
FIG. 5A is GPC curves of recycled crosslinked epoxy resins in accordance with an example embodiment.
Figure 5B:
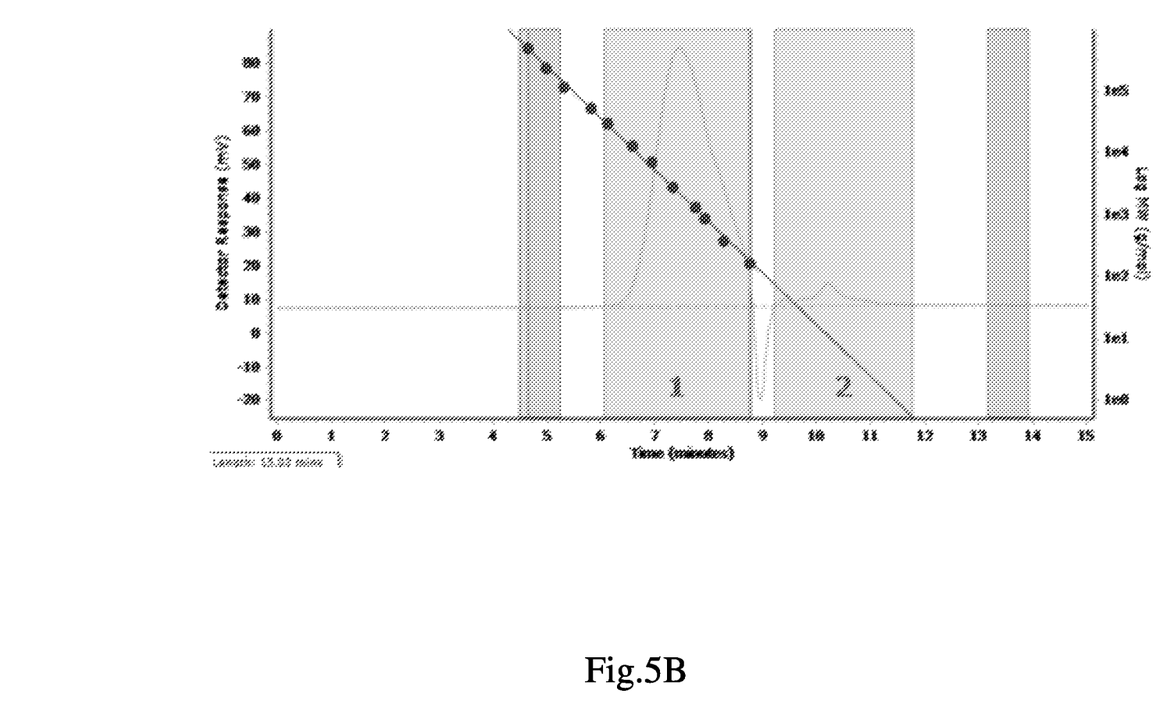
FIG. 5B is GPC curves of recycled crosslinked epoxy resins in accordance with another example embodiment.

From the GPC curves of the decrosslinked epoxy resins, prominent peak representing linear macromolecule appears in both examples 5 and 6 after decrosslinking reaction via the extruder. This indicated that linear polymer molecules were generated by the decrosslinking reaction.

These wastes recycled by the methods discussed herein can be treated continuously and reused for mass production.

As used herein and in the claims, "comprising" means including the following elements but not excluding others.

What is claimed is:

1. A method of continuously recycling thermoset plastic waste, comprising:
   crushing the thermoset plastic waste into pieces with a diameter size suitable for being fed into an extruder;
   purifying the thermoset plastic waste by cleaning the thermoset plastic waste using a cleaning agent to remove contaminants from the thermoset plastic waste; and
   decrosslinking the thermoset plastic waste by combining a supercritical solvent and the thermoset plastic waste in the extruder and extruding the thermoset plastic waste under a temperature of 200-400° C. and an extrusion pressure of 10-150 bar.

2. The method of claim 1, wherein a liquid solvent is introduced into the extruder and becomes the supercritical solvent under the temperature of 200-400° C. and the extrusion pressure of 10-150 bar in the extruder.

3. The method of claim 1, wherein the thermoset plastic waste is selected from a group consisting of polyethylene (XLPE), phenolic resin, and epoxy resin.

4. The method of claim 1, wherein the extruding the thermoset plastic waste requires only one extruder.

5. The method of claim 2, wherein the liquid solvent and the thermoset plastic waste are introduced into the extruder simultaneously.

6. The method of claim 2, wherein the thermoset plastic waste is introduced into the extruder at a thermoset feed rate of 1-60 g/min, and the liquid solvent is introduced into the extruder at a solvent injection rate of 1-50 mL/min.

7. The method of claim 2, wherein the liquid solvent is selected from a group consisting of methanol, ethanol, isopropyl alcohol and a mixture thereof.

8. The method of claim 2, wherein when the thermoset plastic waste is XLPE, the thermoset plastic waste is introduced into the extruder at a thermoset feed rate of 20-30 g/min, a screw rotating speed of the extruder is 15-20 rpm, the liquid solvent is ethanol and is introduced into the extruder at a solvent injection rate of 2-3 mL/min, the extrusion pressure is 105-115 bar, and the temperature is 240-370° C.

9. The method of claim 8, wherein when the thermoset plastic waste is XLPE, the thermoset plastic waste is introduced into the extruder at the thermoset feed rate of 30 g/min, the screw rotating speed of the extruder is 15 rpm, the liquid solvent is ethanol and is introduced into the extruder at the solvent injection rate of 3 mL/min, the extrusion pressure is 105 bar, and the temperature is 240-310° C.

10. The method of claim 8, wherein when the thermoset plastic waste is XLPE, the thermoset plastic waste is introduced into the extruder at the thermoset feed rate of 20 g/min, the screw rotating speed of the extruder is 20 rpm, the liquid solvent is ethanol and is introduced into the extruder at the solvent injection rate of 2 mL/min, the extrusion pressure is 115 bar, and the temperature is 250-370° C.

11. The method of claim 2, wherein when the thermoset plastic waste is phenolic resin, the thermoset plastic waste is introduced into the extruder at a thermoset feed rate of 15-20 g/min, a screw rotating speed of the extruder is 20-30 rpm, the liquid solvent is ethanol and is introduced into the extruder at a solvent injection rate of 5 mL/min, the extrusion pressure is 80-96 bar, and the temperature is 240-320° C.

12. The method of claim 11, wherein when the thermoset plastic waste is phenolic resin, the thermoset plastic waste is introduced into the extruder at the thermoset feed rate of 20 g/min, the screw rotating speed of the extruder is 20 rpm, the extrusion pressure is 80 bar, and the temperature is 240-300° C.

13. The method of claim 11, wherein when the thermoset plastic waste is phenolic resin, the thermoset plastic waste is introduced into the extruder at the thermoset feed rate of 15 g/min, the screw rotating speed of the extruder is 30 rpm, the extrusion pressure is 96 bar, and the temperature is 260-320° C.

14. The method of claim 2, wherein when the thermoset plastic waste is epoxy resin, the thermoset plastic waste is introduced into the extruder at a thermoset feed rate of 16-21 g/min, a screw rotating speed of the extruder is 15-25 rpm, the liquid solvent is ethanol and is introduced into the extruder at a solvent injection rate of 5 mL/min, the extrusion pressure is 80-96 bar, and the temperature is 230-330° C.

15. The method of claim 14, wherein when the thermoset plastic waste is epoxy resin, the thermoset plastic waste is introduced into the extruder at the thermoset feed rate of 21 g/min, the screw rotating speed of the extruder is 15 rpm, the extrusion pressure is 80 bar, and the temperature is 230-310° C.

16. The method of claim 14, wherein when the thermoset plastic waste is epoxy resin, the thermoset plastic waste is introduced into the extruder at the thermoset feed rate of 16 g/min, the screw rotating speed of the extruder is 25 rpm, the extrusion pressure is 96 bar, and the temperature is 260-330° C.

17. The method of claim 1, wherein a screw rotating speed of the extruder is in a range of 1-80 rpm.

18. The method of claim 1, wherein the thermoset plastic waste is extruded out from the extruder in less than 5 minutes.

19. The method of claim 1, wherein purifying the thermoset plastic waste comprises:
   mixing the thermoset plastic waste in the cleaning agent selected from a group consisting of water, methanol, ethanol, isopropyl alcohol and a mixture thereof;
   cleaning the thermoset plastic waste in ultrasonic bath at a temperature of 40-80° C. for 10-30 minutes;
   filtering the thermoset plastic waste through a filtration mesh so that contaminants in the thermoset plastic waste are removed; and
   drying the thermoset plastic waste for further extrusion.

* * * * *